(12) United States Patent
Arberet et al.

(10) Patent No.: US 11,748,921 B2
(45) Date of Patent: Sep. 5, 2023

(54) LEARNABLE EXTRAPOLATION FOR DEEP LEARNING-BASED MEDICAL IMAGE RECONSTRUCTION

(71) Applicant: Siemens Healthcare GmbH, Erlangen (DE)

(72) Inventors: Simon Arberet, Princeton, NJ (US); Mariappan S. Nadar, Plainsboro, NJ (US); Boris Mailhe, Plainsboro, NJ (US); Marcel Dominik Nickel, Herzogenaurach (DE)

(73) Assignee: Siemens Healthcare GmbH, Erlangen (DE)

( * ) Notice: Subject to any disclaimer, the term of this patent is extended or adjusted under 35 U.S.C. 154(b) by 225 days.

(21) Appl. No.: 17/097,060

(22) Filed: Nov. 13, 2020

(65) Prior Publication Data

US 2022/0114771 A1    Apr. 14, 2022

Related U.S. Application Data

(60) Provisional application No. 63/090,311, filed on Oct. 12, 2020.

(51) Int. Cl.
*G06T 11/00* (2006.01)
*G06N 20/00* (2019.01)
*G06T 7/00* (2017.01)

(52) U.S. Cl.
CPC ............ *G06T 11/003* (2013.01); *G06N 20/00* (2019.01); *G06T 7/0012* (2013.01); *G06T 2207/20081* (2013.01); *G06T 2207/20084* (2013.01)

(58) Field of Classification Search
CPC ........ G06N 20/00; G06N 3/0454; G06N 3/08; G06N 5/025; G06N 3/0472; G06N 7/005; G06N 3/0481; G06N 5/022; G06N 3/084; G06N 20/10; G06N 3/082; G06N 3/04; G06N 20/20; G06N 3/0427; G06N 5/02; G06N 5/04; G06N 3/006; G06N 3/0445; G06N 3/088; G06N 5/045; G06N 3/00; G06N 3/02
USPC ......................................................... 382/128
See application file for complete search history.

(56) References Cited

U.S. PATENT DOCUMENTS

| | | | |
|---|---|---|---|
| 9,042,626 B1 * | 5/2015 | Katsevich | A61B 6/503 382/131 |
| 2012/0155736 A1 * | 6/2012 | Faul | A61B 6/5235 382/131 |
| 2015/0254810 A1 * | 9/2015 | Heidrich | G06T 5/006 382/167 |

(Continued)

OTHER PUBLICATIONS

Beck, Amir, and Marc Teboulle. "A fast iterative shrinkage-thresholding algorithm for linear inverse problems." SIAM journal on imaging sciences 2.1 (2009): 183-202.

(Continued)

*Primary Examiner* — Ajibola A Akinyemi

(57) ABSTRACT

For reconstruction in medical imaging, such as reconstruction in MR imaging, the number of iterations in deep learning-based reconstruction may be reduced by including a learnable extrapolation in one or more iterations. Regularization may be provided in fewer than all of the iterations of the reconstruction. The result of either approach alone or both together is better quality reconstruction and/or less computationally expensive reconstruction.

18 Claims, 5 Drawing Sheets

(56) References Cited

U.S. PATENT DOCUMENTS

2019/0369191 A1* 12/2019 Gong .................... A61B 5/055

OTHER PUBLICATIONS

Candès, Emmanuel J., and Michael B. Wakin. "An introduction to compressive sampling." IEEE signal processing magazine 25.2 (2008): 21-30.

Hammernik, K., et al. "Σ-net: Systematic evaluation of iterative deep neural networks for fast parallel MR image reconstruction." arXiv preprint arXiv:1912.09278 1 (2019).

Hammernik, Kerstin, et al. "Learning a variational network for reconstruction of accelerated MRI data." Magnetic resonance in medicine 79.6 (2018): 3055-3071.

Knoll, Florian, et al. "Deep learning methods for parallel magnetic resonance image reconstruction." arXiv preprint arXiv:1904.01112 (2019).

Lustig, Michael, et al. "Application of compressed sensing for rapid MR imaging." SPARS,(Rennes, France) (2005).

Nesterov, Yu. "A method of solving a convex programming problem with convergence rate O $(1/k^2)$," Sov. Math. Dokl. vol. 27 (1983) No. 2.

Nesterov, Yurii. "Gradient methods for minimizing composite objective function. CORE Discussion Papers 2007076, Université catholique de Louvain." Center for Operations Research and Econometrics (CORE) 5.5.3 (2007): 4.

Polyak, Boris T. "Some methods of speeding up the convergence of iteration methods." USSR Computational Mathematics and Mathematical Physics 4.5 (1964): 1-17.

Schlemper, Jo, et al. "A deep cascade of convolutional neural networks for dynamic MR image reconstruction." IEEE transactions on Medical Imaging 37.2 (2017): 491-503.

Sriram, Anuroop, et al. "End-to-End Variational Networks for Accelerated MRI Reconstruction." arXiv preprint arXiv:2004.06688 (2020).

Tsaig, Yaakov, and David L. Donoho. "Compressed sensing." (2004).

Zbontar, Jure, et al. "fastMRI: An open dataset and benchmarks for accelerated MRI." arXiv preprint arXiv:1811.08839 (2018).

* cited by examiner

LEARNABLE EXTRAPOLATION FOR DEEP LEARNING-BASED MEDICAL IMAGE RECONSTRUCTION

RELATED APPLICATIONS

The present patent document claims the benefit of the filing date under 35 U.S.C. § 119(e) of Provisional U.S. Patent Application Ser. No. 63/090,311, filed Oct. 12, 2020, which is hereby incorporated by reference.

FIELD

This disclosure relates to medical image reconstruction, such as reconstruction in magnetic resonance (MR) imaging.

BACKGROUND

Medical imaging, such as magnetic resonance (MR), computed tomography (CT), positron emission tomography (PET), or single photon emission computed tomography (SPECT), use reconstruction to estimate an image or real-space object from measurements. These scans may be time consuming. For example, MR imaging (MRI) is intrinsically slow, and numerous methods have been proposed to accelerate the MRI scan. Various types of MRI scans may be used. One acceleration method is the under-sampling reconstruction technique (i.e., MR compressed sensing (CS)), where fewer samples are acquired in the MRI data space (k-space), and prior knowledge is used to restore the images in reconstruction. MR results obtained using compressed sensing reconstruction tend to show unfolding artifacts. An image regularizer is used in reconstruction to reduce these aliasing artifacts, but the regularizer adds computational burden.

Deep learning (DL) techniques based on unfolding (unrolled) iterative reconstruction algorithms with learnable regularization improve the speed and the reconstruction quality compared to CS. Some DL-based image reconstruction methods are based on unrolled iterative algorithms where a data-consistency step alternates with a regularization network. In order to obtain good results, multiple unrolled iterations are performed. Computational time and memory requirements are directly proportional to the number of unrolled iterations. As a consequence, a limited number of iterations is chosen, usually around e.g. 10. This fixed number of unrolled iterations is a tradeoff between quality and computational complexity. Many iterations are needed for cases where the low-frequencies are not fully sampled (e.g., CS), but many iterations are considered as too computationally intensive.

SUMMARY

By way of introduction, the preferred embodiments described below include methods, systems, instructions, and computer readable media for reconstruction in medical imaging, such as reconstruction in MR imaging. In reconstruction, the number of iterations in DL-based reconstruction may be reduced by including a learnable extrapolation in one or more iterations. Regularization may be provided in fewer than all of the iterations of the reconstruction. The result of either approach alone or both together is better quality reconstruction and/or less computationally expensive reconstruction.

In a first aspect, a method is provided for reconstruction of a medical image in an medical imaging system. The medical imaging system scans a patient. The scanning results in measurements. An image processor reconstructs the medical image from the measurements. The reconstruction includes a regularizer implemented with a machine-learned network and includes an extrapolation with a machine-learned parameter. The medical image is displayed.

In one embodiment, a magnetic resonance (MR) scanner scans the patient, and the measurements are k-space measurements. CT, PET, or SPECT scanners and projection or emission measurements may be used. The reconstruction is a three-dimensional distribution of voxels representing a volume of the patient, and the image is a volume or surface rendering from the voxels to a two-dimensional display. Two-dimensional scans and imaging may be used.

The reconstruction, in a DL embodiment, determines an updated image object from an input image object. In one embodiment, the reconstruction is an unrolled iterative reconstruction. For example, different machine-learned networks and different machine-learned parameters for extrapolation for each iteration are used. The machine-learned network is one of the different machine-learned networks for one of the iterations, and the machine-learned parameter for the extrapolation is one of the different machine-learned parameters for the one iteration. Different sequences may be used. For example, a first sequence of iterations of the unrolled iterative reconstruction does not include regularization, and a second sequence after the first sequence includes regularization. One of the iterations of the second sequence uses the regularizer and the extrapolation.

In some embodiments, the extrapolation is a Nesterov extrapolation wherein the machine-learned parameter is a weight for a difference between current and previous image values. In other embodiments, the extrapolation is a Polyak heavy ball extrapolation wherein the machine-learned parameter comprises a weight for a difference between current and previous image values. The extrapolation, according to one embodiment, provides momentum to a gradient descent, and the regularizer operates on an output of the gradient descent.

The machine-learned network may be any of various networks, such as deep learned neural network. For example, a generative network of a generative adversarial network (GAN), a progressive GAN, a fully connected neural network, or a convolutional neural network is used.

In a second aspect, a method of machine training is provided for reconstruction in medical imaging. A first sequence of neural networks and weights of an extrapolation for the reconstruction in the medical imaging are machine trained. The first sequence is an unrolled reconstruction where different iterations of the unrolled reconstruction include different ones of the neural networks and the extrapolation with different ones of the weights. The neural networks and the weights are stored for later application to an unseen input set of measurements for reconstruction.

In one embodiment, the neural networks are trained as convolutional neural networks performing as regularizers in the reconstruction. For extrapolation, the weights are machine trained as weights of a Nesterov extrapolation or a heavy ball extrapolation.

In an additional embodiment, a second sequence with additional weights for extrapolation and without the neural networks is machine trained. The second sequence provides additional iterations of the reconstruction occurring prior to the first sequence.

In a third aspect, a system is provided for reconstruction in medical imaging. A medical scanner is configured to scan a region of a patient. The scan provides scan data. An image processor is configured to reconstruct a representation of the region from the scan data. The image processor is configured to reconstruct by application of a extrapolation with a machine-learned weight and application of a gradient update operating on an output of the extrapolation. A display is configured to display an image of the region from the reconstructed representation.

In one embodiment, the image processor is configured to reconstruct by application of a machine-learned model as a regularization operating on an output of the gradient update. In another embodiment, the reconstruction is an unrolled iterative reconstruction with the machine-learned weight having different values for the extrapolation for different iterations of the unrolled iterative reconstruction. In yet another embodiment, the extrapolation is a Nesterov extrapolation.

The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

To decrease the need for computationally costly unrolled iterations, an extrapolation mechanism, inspired by mathematical optimization, is added. A more computationally cheap and efficient type of unrolled iteration may be further enhanced by providing different sequences of iterations, one without regularization ("pre-iterations") and one with learnable regularization ("learnable-iterations"). The proposed pre-iterations and extrapolations steps described are particularly useful when low-frequencies are not fully sampled as e.g. in the T2 HASTE MRI protocol. In CS or other reduced sampling, many iterations would normally be necessary by a conventional reconstruction method to bring back the energy of the image during the reconstruction process. The learned extrapolation may reduce the number of iterations needed to provide the same quality.

The two mechanisms may be used together or independently. In the first mechanism, the extrapolation (e.g., Nesterov, Polyak heavy ball, or fast iterative soft thresholding algorithm (FISTA)) is added before the gradient (i.e. data-consistency) step of the reconstruction. Another possible variation for the architecture of the extrapolation step is to use a learnable extrapolation. The extrapolation step is learnable with the other weights of the neural network used in the reconstruction. The extrapolation steps of the reconstruction have a very low, even neglectable, computational complexity. In the second mechanism, the reconstruction is divided into two or more sequences. In one sequence, a certain number of cheap iterations of a gradient (i.e. data-consistency) step preceded by a learnable extrapolation step, but without any regularization, is performed. In the another, later sequence, the full unrolled iterations that include the regularization are performed.

In combination, the performance of deep-learning based image reconstruction based on unrolled iterations is increased while almost not increasing the computational complexity. There are only one weight to learn per iteration of the learnable Nesterov extrapolation step and only two simple operations (1 addition and one subtraction). Another weight for the gradient step size may also be learned. As a comparison, the network that is used for the regularization has typically a number of parameters higher than a million. The number of iterations is reduced by adding a relatively few number of operations in an extrapolation.

Figure 1:
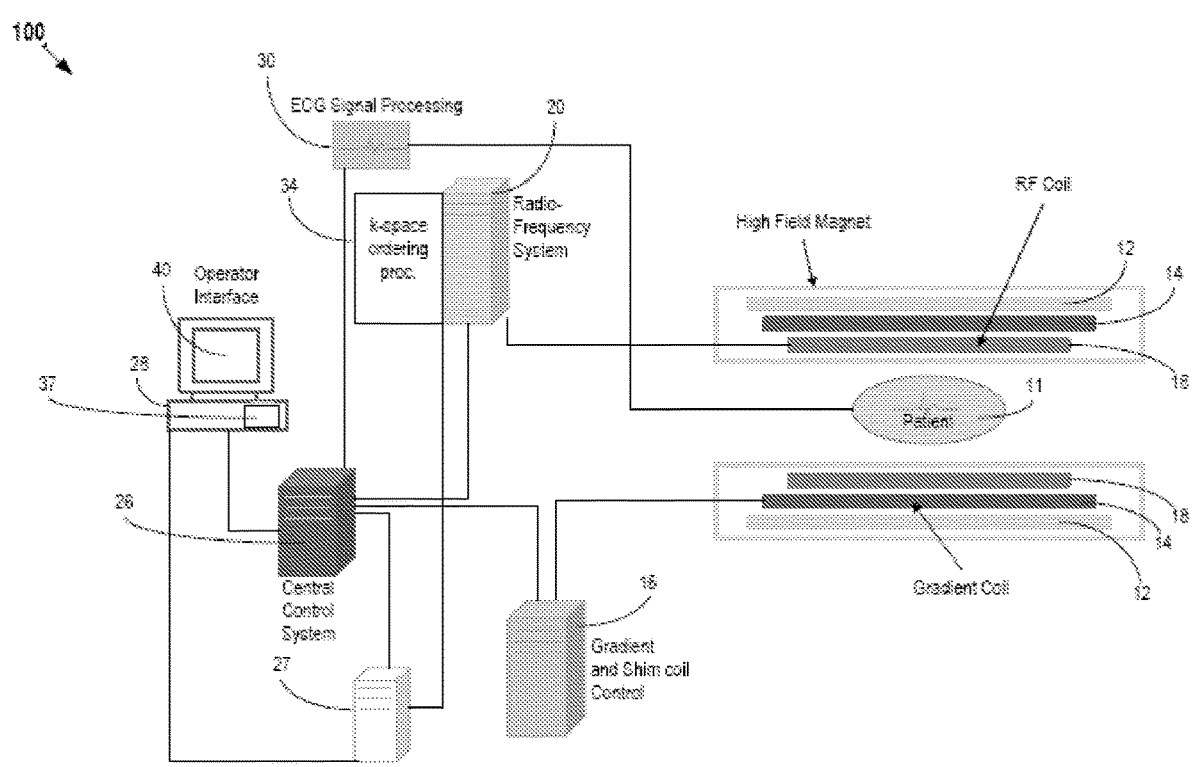
FIG. 1 is a block diagram of an embodiment of an MR system for medical imaging using a machine-learned parameter for extrapolation or iterations where some do not include regularization.

FIG. 1 shows one embodiment of a system for reconstruction in medical imaging. This example is in a magnetic resonance context (i.e., a magnetic resonance scanner), but the learnable extrapolation and/or the sequence where some iterations do not include regularization may be used in reconstruction for CT, PET, SPECT, or other medical imaging. The learnable extrapolation and/or different iterations approaches are used for reconstruction into an object or image domain from projections or measurements in another domain. In the discussion below, the MR context is used.

The system uses a machine-learned model in reconstruction. The machine-learned model is formed from one or more networks and/or other machine-learned architecture. For example, the machine-learned model is a deep learned neural network and/or extrapolation weight for multiple iterations of the reconstruction. The machine-learned model is used in any aspect of reconstruction. In one embodiment, the machine-learned model is formed as a convolutional neural network for use as a regularizer or denoiser in the reconstruction. Image or object domain data is input, and image or object domain data with less artifact is output. The machine-learned model assists in compressed, parallel sensing, or other MR imaging for more rapid scanning of the patient with less artifacts. The reconstruction also includes extrapolation where the extrapolation includes a learnable parameter (e.g., a weight). The remaining portions or stages of the reconstruction (e.g., Fourier transform and gradients in iterative optimization) are performed using reconstruction algorithms and/or other machine-learned networks included in the machine-learned model. In other embodiments, the machine-learned model replaces, at least in part, the Fourier transform so that k-space measurements are input, and image or object domain data is output.

The system is implemented by an MR scanner or system, a computer based on data obtained by MR scanning, a server, or another processor. MR scanning system 100 is only exemplary, and a variety of MR scanning systems can be used to collect the MR data. In the embodiment of FIG. 1, the system is or includes the MR scanner or MR system 100. The MR scanner 100 is configured to scan a patient. The scan provides scan data in a scan domain. The system 100 scans a patient to provide k-space measurements (measurements in the frequency domain). In the system 100, magnetic coils 12 create a static base magnetic field in the body of patient 11 to be positioned on a table and imaged. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generate magnetic field pulse sequences. The shimmed gradients compensate for inhomogeneity and variability in an MR imaging device magnetic field resulting from patient anatomical variation and other sources. The magnetic field gradients include a slice-selection gradient magnetic field, a phase-encoding gradient magnetic field, and a readout gradient magnetic field that are applied to patient 11.

RF (radio frequency) module 20 provides RF pulse signals to RF coil 18, which in response produces magnetic field pulses that rotate the spins of the protons in the imaged body of the patient 11 by ninety degrees, by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives MR signals, i.e., signals from the excited protons within the body as they return to an equilibrium position established by the static and gradient magnetic fields. The MR signals are detected and processed by a detector within RF module 20 and k-space component processor unit 34 to provide an MR dataset to an image data processor for processing into an image (i.e., for reconstruction in the object domain from the k-space data in the scan domain). In some embodiments, the image data processor is located in or is the central control unit 26. In other embodiments, such as the one depicted in FIG. 1, the image data processor is located in a separate unit 27. ECG synchronization signal generator 30 provides ECG signals used for pulse sequence and imaging synchronization. A two- or three-dimensional k-space storage array of individual data elements in k-space component processor unit 34 stores corresponding individual frequency components forming an MR dataset. The k-space array of individual data elements has a designated center, and individual data elements individually have a radius to the designated center.

A magnetic field generator (comprising coils 12, 14 and 18) generates a magnetic field for use in acquiring multiple individual frequency components corresponding to individual data elements in the storage array. The individual frequency components are successively acquired using a Cartesian acquisition strategy as the multiple individual frequency components are sequentially acquired during acquisition of an MR dataset representing an MR image. A storage processor in the k-space component processor unit 34 stores individual frequency components acquired using the magnetic field in corresponding individual data elements in the array. The row and/or column of corresponding individual data elements alternately increases and decreases as multiple sequential individual frequency components are acquired. The magnetic field acquires individual frequency components in an order corresponding to a sequence of substantially adjacent individual data elements in the array, and magnetic field gradient change between successively acquired frequency components is substantially minimized. The central control processor 26 is programmed to sample the MR signals according to a predetermined sampling pattern. Any MR scan sequence may be used, such as for T1, T2, or other MR parameter. In one embodiment, a compressive sensing scan sequence is used.

The central control unit 26 also uses information stored in an internal database to process the detected MR signals in a coordinated manner to generate high quality images of a selected slice(s) of the body (e.g., using the image data processor) and adjusts other parameters of system 100. The stored information comprises predetermined pulse sequence and magnetic field gradient and strength data as well as data indicating timing, orientation and spatial volume of gradient magnetic fields to be applied in imaging.

The central control unit 26 (i.e., controller) and/or processor 27 is an image processor that reconstructs a representation of the patient from the k-space data. The image processor is a general processor, digital signal processor, three-dimensional data processor, graphics processing unit, application specific integrated circuit, field programmable gate array, artificial intelligence processor, digital circuit, analog circuit, combinations thereof, or another now known or later developed device for reconstruction. The image processor is a single device, a plurality of devices, or a network. For more than one device, parallel or sequential division of processing may be used. Different devices making up the image processor may perform different functions, such as reconstructing by one device and volume rendering by another device. In one embodiment, the image processor is a control processor or other processor of the MR scanner 100. Other image processors of the MR scanner 100 or external to the MR scanner 100 may be used.

The image processor is configured by software, firmware, or hardware to reconstruct. The image processor operates pursuant to stored instructions to perform various acts described herein.

The image processor is configured to reconstruct a representation in an object domain. The object domain is an image space and corresponds to the spatial distribution of the patient. A planar area or volume representation is reconstructed as an image representing the patient. For example, pixels values representing tissue in an area or voxel values representing tissue distributed in a volume are generated.

The representation in the object domain is reconstructed from the scan data in the scan domain. The scan data is a set or frame of k-space data from a scan of the patient. The k-space measurements resulting from the scan sequence are transformed from the frequency domain to the spatial domain in reconstruction. In general, reconstruction is an iterative process, such as a minimization problem. This minimization can be expressed as:

$$x = \underset{x}{\operatorname{argmax}} \; \|Ax - y\|_2^2 + \lambda \|Tx\|_1 \qquad (1)$$

where x is the target image to be reconstructed, and y is the raw k-space data. A is the MRI model to connect the image to MRI-space (k-space), which can involve a combination of an under-sampling matrix U, a Fourier transform F, and sensitivity maps S. T represents a sparsifying (shrinkage) transform. λ is a regularization parameter. The first term of the right side of equation 1 represents the image (2D or 3D spatial distribution or representation) fit to the acquired data, and the second term of the right side is a term added for denoising by reduction of artifacts (e.g., aliasing) due to under sampling. The l1 norm is used to enforce sparsity in the transform domain. $\|Ax-y\|_2^2$ is the l2 norm of the variation of the under-sampled k-space data. Generally, the lp norm is $$\sqrt[p]{\sum |x|^p}.$$

In some embodiments, the operator T is a wavelet transform. In other embodiments, the operator T is a finite difference operator in the case of Total Variation regularization.

Figure 2:
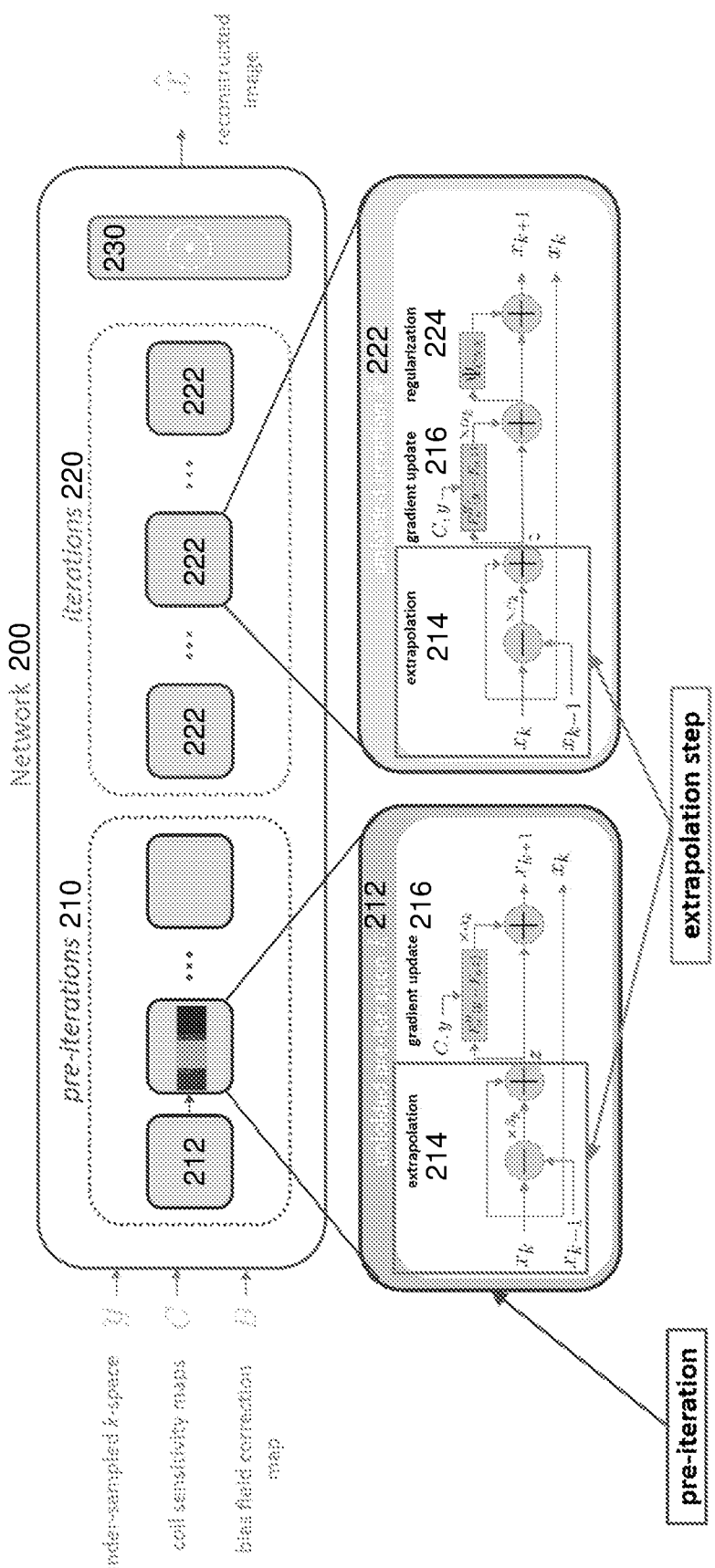
FIG. 2 is an example of unrolled iterative reconstruction using both iterations without regularization and learned extrapolation.

The image processor is configured to reconstruct using one or both mechanisms—learnable extrapolation in one or more iterations and/or unrolled iterations where some do not include regularization. FIG. 2 shows an example of unrolled iterative reconstruction as a network or model 200 of iteration sequences 210, 220. This example uses both mechanisms.

The unrolled iterative reconstruction includes two sequences 210, 220 of iterations 212, 222. The earlier sequence 210 (labeled "pre-iterations") includes iterations 212 with extrapolation 214 and gradient updates 216. Regularization is not included in the iterations 212. The later sequence 220 includes iterations 222 with extrapolation 214, gradient update 216, and regularization 224. In other embodiments, other sequences with other combinations of operations may be provided, such as a third sequence after the sequence 220 that includes gradient updates and regularization without extrapolation. Other orders of the different sequences 210, 220 may be provided. By including different sequences, the number of operations or computational cost for some iterations may be reduced. Alternatively, all the iterations have the same operations.

The network 200 also includes bias field correction 230. The input bias field correction map, B, is applied to correct for biases in the image object output after the iterations. Other filtering and/or operations for reconstruction and/or post-reconstruction may be provided.

Each of the sequences 210, 220 shown in the example of FIG. 2 include the extrapolation 214 with the machine-learned parameter. Since machine learning is used to determine the value of the weight or weights in the extrapolation 214 of each or at least some iterations 212, 222, the values for different iterations 212, 222 are the same or different. The machine-learned parameters have different values for the extrapolation 214 based on the placement of the iteration 212, 222 in the sequence 200. To minimize the data fidelity but also minimize computational complexity, the gradient steps 216 are to be as efficient as possible. The extrapolation 214 provides momentum to increase the efficiency of the gradient descent 216. The variation in the gradient is minimized or made more consistent by the extrapolation 214, allowing for decreased computational complexity by more directly reaching the minimum in the reconstruction.

Rather than using pre-assigned weights and/or a same weight for each iteration 212, 222, one or more weights of the extrapolation are machine learned. For example, the extrapolation has an output z, which is a function of a weighted difference of a current input and a previous input image object x. "k" is used as an index of the (unrolled) iteration, and β is the weight.

Any one of various extrapolations 214 may be used. The same extrapolation function is used for each iteration 212, 222. Alternatively, different extrapolation functions are used for different iterations 212, 222 and/or different sequences 210, 220.

In one example, the extrapolation 214 is a Polyak heavy ball momentum. The heavy ball momentum is represented as two sequential equations:

$$z_{k+1} = \beta z_k + \nabla f(x_k)$$

$$x_{k+1} = x_k - \alpha z_{k+1} \qquad (2)$$

where α is another weight and ∇f is a gradient function of f and f is the data consistency $|Ax-y|^2$. These equations may be restated as equivalences as:

$$x_{k+1} = x_k - \alpha \nabla f(x_k) + \beta(x_k - x_{k-1})$$

$$z_{k+1} = \beta z_k + \nabla f(x_k)$$

$$x_{k+1} = x_k - \alpha z_{k+1} \qquad (3)$$

Generalizing with the proximal method (iPiasco), the equations become:

$$x_{k+1} = \text{prox}_{\alpha g}(x_k - \alpha \nabla f(x_k) + \beta(x_k - x_{k-1})),$$

which is equivalent to the following two steps updates:

$$z_k = x_k + \beta_k(x_k - x_{k-1})$$

$$x_{k+1} = \text{prox}_{\alpha g}(z_k - \alpha \nabla f(x_k)) \qquad (4)$$

In implementation, the Polyak heavy ball momentum is implemented as the output $z_k$ being a sum of the input $x_k$ with a weighed difference between the input $x_k$ and the previous input $x_{k-1}$. The output image object $x_{k+1}$ of the iteration 212 is a sum of the extrapolation output $z_k$ with the gradient α∇f.

Figure 3:
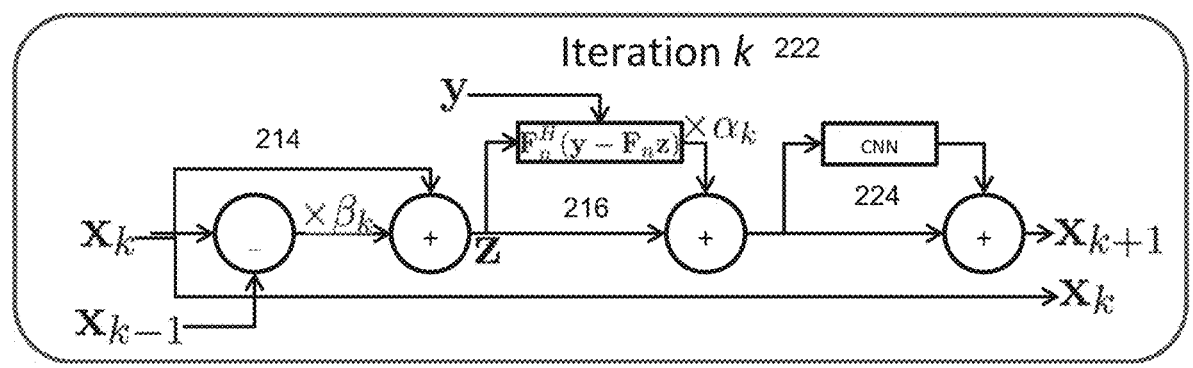
FIG. 3 shows an embodiment of iteration with Nesterov extrapolation having a learned weight, gradient descent, and machine-learned regularization.

FIG. 3 shows an example of the extrapolation 214 implemented as a Polyak heavy ball momentum, where the dashed line represents the extrapolation moving x closer to the desired object in the middle of the field of all possible images. The extrapolation uses one additional buffer, z, for the output. This represents the minimal cost to implement the extrapolation.

In another embodiment, the extrapolation 214 is a Nesterov momentum. The Nesterov momentum is represented as two sequential equations:

$$z_k = x_k + \beta_k(x_k - x_{k-1})$$

$$x_{k+1} = z_k - \alpha \nabla f(z_k) \qquad (5)$$

These equations may be restated as equivalences extended to proximal gradients as:

$$z_k = x_k + \beta_k(x_k - x_{k-1})$$

$$x_{k+1} = \text{prox}_{\alpha g}(z_k - \alpha \nabla f(z_k)) \qquad (6)$$

In implementation, the Nesterov momentum is implemented as the output $z_k$ being a sum of the input $x_k$ with a weighed difference between the input $x_k$ and the previous input $x_{k-1}$. The output image object $x_{k+1}$ of the iteration 212 is a sum of the extrapolation input $z_k$ with the gradient α∇f.

FIG. 3 shows the iteration 222 using Nesterov extrapolation 214 with gradient descent 216 and the regularizer 224. The output of the gradient update 216 is summed with a regularizing output of the machine-learned network, forming the output $x_{k+1}$. In other words, the prox of Equation (6) above is replaced by a neural network (e.g., CNN or other) with possible a residual connection.

Other extrapolations may be used. The weight β is a learned parameter. Machine learning is performed to determine the value for the weight for any or each of the iterations 212, 222 with the extrapolation 214.

In reconstruction, the output, $z_k$, of the extrapolation 214 is used with the gradient operation 216. In the heavy ball embodiment, the output of the extrapolation 214 is summed with the output of the gradient 216, which gradient 216 is based on the input $x_k$ image object. In the Nesterov embodiment, the output of the extrapolation 214 is input to the gradient and summed with an output of the gradient operation 216.

The gradient update 216 compares the current image object with the scan data (e.g., k-space measurements, y). This comparison uses a system transform to relate the measurements to the image object. Any gradient or comparison relating the image object to the measurements may be used. In one embodiment, a step size, a, of the gradient update 216 (see equation 6) is a machine-learned parameter. Like the extrapolation weight, the step size for iteration 212, 222 is learned as part of the machine training.

As shown in FIGS. 2 and 3, the iterations 222 with regularization 224 includes the regularizer operating on the output of the gradient update 216. The regularizer is a machine-learned network. In one embodiment, deep learning is used to train a convolutional neural network as the regularizer.

Machine learning is an offline training phase where the goal is to identify an optimal set of values of learnable parameters of the model that can be applied to many different inputs (i.e., image domain data after gradient calculation in the optimization or minimization of the reconstruction). These machine-learned parameters can subsequently be used during clinical operation to rapidly reconstruct images. The weight of the extrapolation 214 is learned with or as part of the process of machine training the regularization 224. Once learned, the machine-learned model is used in an online processing phase in which MR scan data for patients is input and the reconstructed representations for the patients are output based on the model values learned during the training phase.

During application to one or more different patients and corresponding different scan data, the same learned weights or values for the extrapolation 214 and the regularization 224 are used. The model and values for the learnable parameters are not changed from one patient to the next, at least over a given time (e.g., weeks, months, or years) or given number of uses (e.g., tens or hundreds). These fixed values and corresponding fixed model are applied sequentially and/or by different processors to scan data for different patients. The model may be updated, such as retrained, or replaced but does not learn new values as part of application for a given patient.

The model has an architecture. This structure defines the learnable variables and the relationships between the variables. In one embodiment for the regularization 224, a neural network is used, but other networks may be used. For example, a convolutional neural network (CNN) is used. Any number of layers and nodes within layers may be used. A DenseNet, U-Net, encoder-decoder, Deep Iterative Down-Up CNN, and/or another network may be used. In one embodiment, an image-to-image neural network (spatial distribution input and spatial distribution output) is used. The image-to-image neural network may include convolution layers or be a CNN. Some of the network may include dense blocks (i.e., multiple layers in sequence outputting to the next layer as well as the final layer in the dense block). Any know known or later developed neural network may be used.

Deep learning is used to train the model. The training learns both the features of the input data and the conversion of those features to the desired output (i.e., denoised or regularized image domain data). Backpropagation, RMSprop, ADAM, or another optimization is used in learning the values of the learnable parameters including the learnable parameter of the extrapolation 214 and the learnable parameters of the regularization 224 (i.e., the CNN). Where the training is supervised, the differences (e.g., L1, L2, or mean square error) between the estimated output and the ground truth output are minimized. Where a discriminator is used in training, the ground truth is not needed. Instead, the discriminator determines whether the output is real or estimated as an objective function for feedback in the optimization. The characteristic is one that likely distinguishes between good and bad output by examining the output rather than by comparison to a known output for that sample. Joint training (e.g., semi-supervised) may be used.

The training uses multiple samples of input sets, such as object domain data representing patients after Fourier transform and/or gradient calculation. The scan data for these samples is generated by scanning a patient and/or phantom with different settings or sequences, scanning different patients and/or phantoms with the same or different settings or sequences, and/or simulating MR scanning with an MR scanner model. By using many samples, the model is trained given a range of possible inputs. The samples are used in deep learning to determine the values of the learnable variables (e.g., values for convolution kernels) that produce outputs with minimized cost function and/or maximized likelihood of being a good representation (i.e., discriminator cannot tell the difference) across the variance of the different samples.

In one embodiment, the image processor is configured to reconstruct with the CNN as trained being used as a regularizer in the reconstruction. The iterative reconstruction may be unrolled where a given number of iterations is used. The same CNN is used for each iteration. Alternatively, a different CNN is provided for each iteration, whether a different architecture or same architecture but with different values for one or more of the learnable parameters of the CNN. Different CNNs are trained for different iterations in the reconstruction. Each CNN may have the same architecture, but each is separately learned so that different values of the learnable parameters may be provided for different iterations 222 of the reconstruction.

Once trained, the machine-learned model (e.g., learned extrapolation weight and learned CNN) is used for reconstruction of a spatial representation from input k-space measurements for a patient. For example, the extrapolator with the learned parameter is applied to guide the gradient descent and the CNN is applied to regularize image domain data in the reconstruction.

The image processor may be configured to generate an MR image from the reconstructed representation. Where the representation is of an area, the values of the representation may be mapped to display values (e.g., scalar values to display color values) and/or formatted (e.g., interpolated to a display pixel grid). Alternatively, the output representation is of display values in the display format. Where the representation is of a volume, the image processor performs volume or surface rendering to render a two-dimensional image from the voxels of the volume. This two-dimensional image may be mapped and/or formatted for display as an MR image. Any MR image generation may be used so that the image represents the measured MR response from the patient. The image represents a region of the patient.

Generated images of the reconstructed representation for a given patient are presented on a display 40 of the operator interface. Computer 28 of the operator interface includes a graphical user interface (GUI) enabling user interaction with central control unit 26 and enables user modification of magnetic resonance imaging signals in substantially real time. Display processor 37 processes the magnetic resonance signals to provide image representative data for display on display 40, for example.

The display 40 is a CRT, LCD, plasma, projector, printer, or other display device. The display 40 is configured by loading an image to a display plane or buffer. The display 40 is configured to display the reconstructed MR image.

Figure 4:
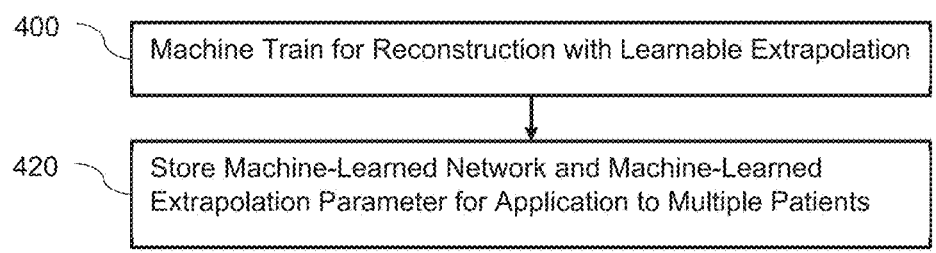
FIG. 4 is a flow chart diagram of one embodiment of a method for machine training for reconstruction with learnable extrapolation.

FIG. 4 is a flow chart diagram of one embodiment of a method for machine training for reconstruction in medical imaging, such as training a neural network to regularize in reconstruction from signals collected by an MR scanner and training the extrapolation. Once trained, the machine-learned model (e.g., extrapolation and regularization) may be used with the same learned values in reconstruction of representations for any number of patients from a respective number of sets of MR scan data for the patients.

The method is implemented by a computer, such as a personal computer, workstation, and/or server. Other computers may be configured to perform the acts of FIG. 4. The MR scanner 100 or central control unit 26 may implement the method. In one embodiment, the computer and a database are used to machine train and store the samples and the resulting final trained model. The stored model is then distributed to one or more MR scanners 100 for application using the model as fixed (i.e., the learned values of the variables are not changed for reconstructions for a given patient and/or for different patients).

The method is performed in the order shown (i.e., top to bottom or numerical). Additional, different, or fewer acts may be provided. For example, instead of or in addition to storing in act 420, the machine-learned model is applied to previously unseen scan data for a patient in a reconstruction. As another example, acts for gathering and/or accessing training data are performed.

In act 400, a computer (e.g., image processor) machine trains a model for reconstruction, such as training for extrapolation and/or regularization. To machine train, training data is gathered or accessed. The training data includes many sets of data, such as image or object domain data. Tens, hundreds, or thousands of sample image data from reconstruction are acquired, such as from scans of patients, scans of phantoms, simulation of scanning, and/or by image processing to create further samples. Many examples that may result from different scan settings, patient anatomy, scanner characteristics, or other variance that results in different samples in scanning are used. In one embodiment, the samples are for MR compressed sensing, such as image domain data resulting from under sampled k-space data.

The training data may and/or may not include ground truth information. The desired representation or image resulting from a given sample is and/or is not provided. For example, the image data without or with reduced artifacts to be output by regularization is provided as ground truth with some or all of the samples of input image data.

Any architecture or layer structure for machine learning may be used. The architecture defines the structure, learnable parameters, and relationships between parameters. In one embodiment, a convolutional or another neural network is used for the regularizer and a weight as the learnable parameter is used for the extrapolation. Deep machine training is performed. Any number of hidden layers may be provided between the input layer and output layer. For machine training, the model (e.g., network or architecture) is trained with deep machine learning. An optimization, such as Adam, is performed using the various samples. The values of the learnable parameters that minimize the cost function and/or maximize discriminator confusion across the training samples are found using the optimization. The machine learns from the training data.

In one embodiment, a sequence of iterations including algorithms for extrapolation and gradient decent as well as a learnable weight in extrapolation and a neural network for regularization are machine trained. This unrolled reconstruction network is machine trained to provide a sequence of iterations where each iteration is trained to operate in the sequence. Different or the same values for the learnable parameters may be provided for different iterations, depending on the machine training. The result of the training is different neural networks and extrapolations in the sequence. This network or unrolled reconstruction is trained end-to-end by the optimization of one or more loss functions.

The CNN is machine trained to regularize or denoise. Additionally, or alternatively, the neural network is used for other reconstruction operations, such as the gradient descent. The extrapolation is a Nesterov, Polyak heavy ball, or other extrapolation where one or more weights are machine trained.

In a further embodiment, the iterations vary within the reconstruction network or model. For example, a first sequence of iterations without neural networks and/or without regularization is trained along with a second sequence of iterations with regularization implemented with or without neural networks are trained. In other examples, other sequences may be included, such as a sequence of iterations without extrapolation and with regularization. The variation in sequences may follow any pattern, such as repeating. The sequences are trained end-to-end together to minimize a loss, but separate or pre-training may be used.

Once trained, the learned extrapolation weights and neural networks are applied in reconstruction of a representation or image of a patient from a scan of that patient. For example, the machine-learned networks for regularization and the machine-learned weights for extrapolation are used with reconstruction algorithms (e.g., gradient descent and extrapolation) during unrolled iterative reconstruction.

In one embodiment, the unrolled reconstruction is used. The unrolled reconstruction includes a set number of iterations, but another optimization stop criterion may be used. Each iteration may be handled differently. For example, a separate weight value for extrapolation and separate neural network is trained for each iteration. The same or different architecture of the network is used for the different iterations. The same or different extrapolation algorithm is used for each iteration. For example, different networks of the same architecture but with one or more different learned values of the learnable parameters are provided for different ones of the iterations. As another example, the same extrapolation but with different values of the weights are provided for different ones of the iterations. In training, each network and weight or weights are trained simultaneously or together across iterations. By reconstructing as part of training, the simultaneous training for the different iterations is provided.

In another embodiment, the reconstruction or part of the reconstruction is an iterative optimization (i.e., not unrolled). The reconstruction includes an optimization. The machine-learned model (e.g., learned extrapolation weight and learned regularization network) is used within or as part of the reconstruction optimization, such as for extrapolating, gradient descent, and/or denoising data in different iterations. The iterations continue until a stop criterion is reached, at which point the output image from one of the iterations is provided as the reconstructed representation.

After training, the machine-learned model or models are represented as a matrix, filter kernels, and/or architecture with the learned values. The learned convolution kernels, weights, connections, and/or layers of the neural network or networks are provided. The learned weights of the extrapolations are provided.

In act 420 of FIG. 4, the computer or image processor stores the machine-learned model resulting from the machine learning. For example, the regularizer networks and the learned extrapolation weights, including the iteration order or sequence, are stored. The matrix or other parameterization of the machine-learned networks and the weight values are saved in memory. The machine-learned model may be stored locally or transferred over a network or by moving the memory to other computers, workstations, and/or MR scanners.

The model resulting from the machine training using the plurality of the samples is stored. This stored model has fixed weights or values of learnable parameters determined based on the machine training. These weights or values are not altered by patient-to-patient or over multiple uses for different medical scans. The weights or values are fixed, at least over a number of uses and/or patients. The same weights or values are used for different sets of scan data corresponding to different patients. The same values or weights may be used by different medical scanners. The fixed machine-learned model or models are to be applied without needing to train as part of the application. Retraining or updated training may be provided.

Figure 5:
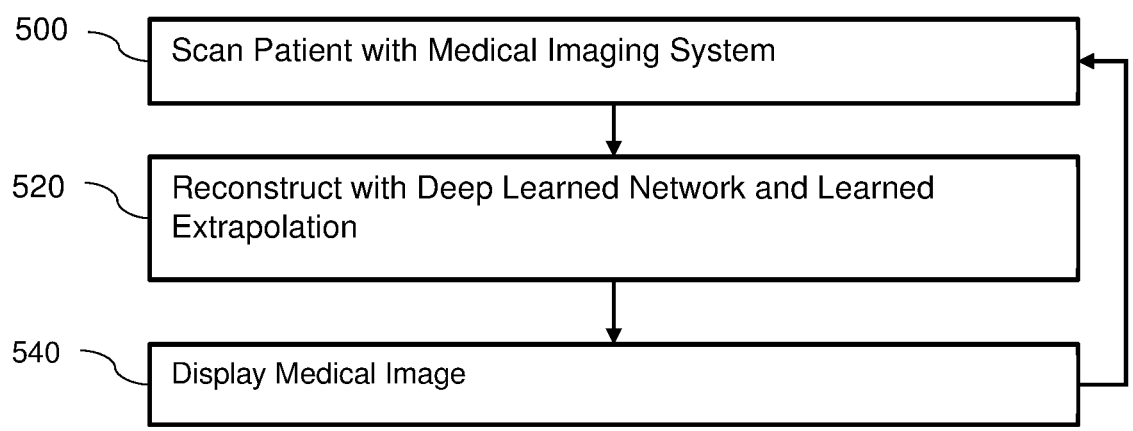
FIG. 5 is a flow chart diagram of one embodiment of a method for reconstruction using a deep learned network and a learned extrapolation.
Figure 6:
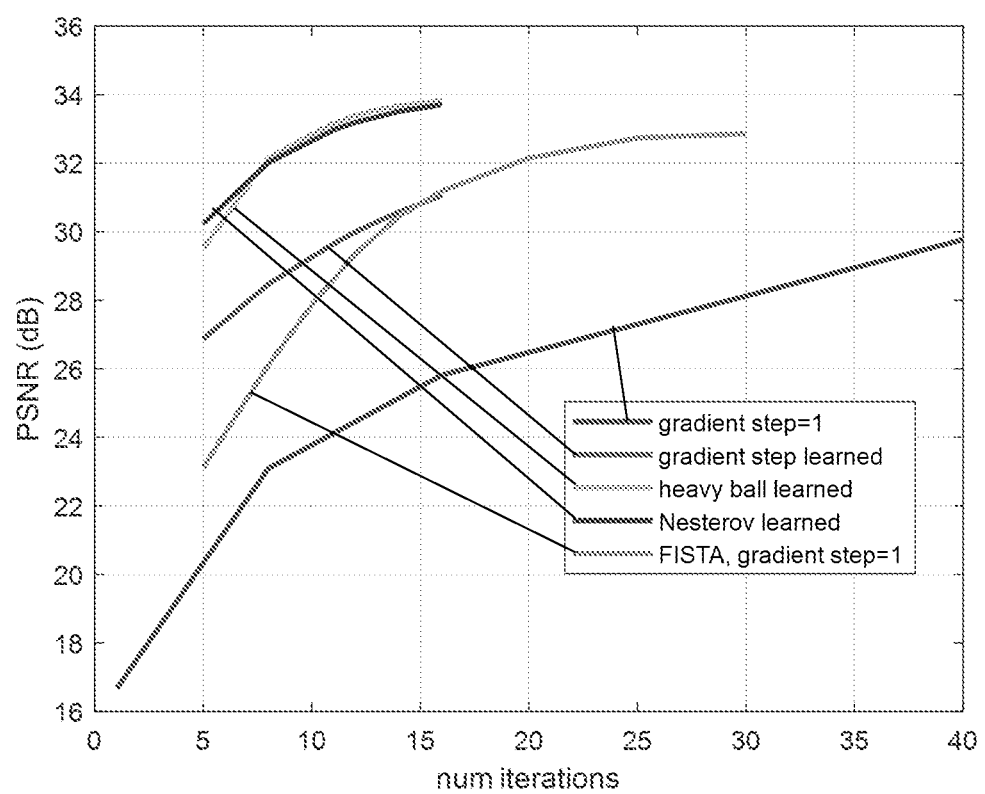
FIG. 6 is a graph showing examples of reconstruction quality as a function of number of iterations for five different approaches for reconstruction.

FIG. 5 is a flow chart diagram of one embodiment of a method for reconstruction of a medical image in a medical imaging system, such as reconstruction of a MR image in an MR system. A machine-learned model as trained is applied in the reconstruction. The machine-learned model was previously trained, including a learned weight for extrapolation and/or including a sequence of unrolled iterations where some of the iterations do not include regularization. A fewer number of iterations and/or less computational burden result from using learnable extrapolation and/or some iterations without regularization.

The method is performed by the system of FIG. 1 or another system. The medical scanner scans the patient. An image processor reconstructs the image using the machine-trained model, and a display displays the medical image. Other components may be used, such as a remote server or a workstation performing the reconstruction and/or display.

The method is performed in the order shown or other orders. Additional, different, or fewer acts may be provided. For example, a preset, default, or user input settings are used to configure the scanning prior art act 500. As another example, the image is stored in a memory (e.g., computerized patient medical record) or transmitted over a computer network instead of or in addition to the display of act 540.

In act 500, the medical system scans a patient. For example, an MR scanner or another MR system scans the patient with an MR compressed (e.g., under sampling) or another MR sequence. The amount of under sampling is based on the settings, such as the acceleration. Based on the configuration of the MR scanner, a pulse sequence is created. The pulse sequence is transmitted from coils into the patient. The resulting responses are measured by receiving radio frequency signals at the same or different coils. The scanning results in k-space measurements as the scan data. In another example, a computed tomography scanner scans a patient by transmitting x-rays from different angles through the patient. The scanning results in detected projections for a given patent as the scan data.

In act 520, an image processor reconstructs a representation of the patient from the scan data. For MR reconstruction, the k-space data is Fourier transformed into scalar values representing different spatial locations, such as spatial locations representing a plane through or volume of a region in the patient. Scalar pixel or voxel values are reconstructed as the MR image. The spatial distribution of measurements in object or image space is formed. This spatial distribution represents the patient.

The reconstruction is performed, at least in part, using a deep machine-learned model, such as a neural network trained with deep machine learning for regularization and a weight for extrapolation trained as part of the deep machine learning. The machine-learned model is previously trained, and then used in reconstruction as trained. Fixed values of learned parameters are used for application.

In application of the already trained network, the reconstruction process is followed. The machine-learned model is used in the reconstruction. For example, extrapolation is performed in every or some iterations using weights learned for those iterations, and regularization is performed in every or only some iterations using the deep learned network (e.g., CNN). In response to the input for a given patient, a patient specific image is reconstructed. The machine-learned model outputs the image as pixels, voxels, and/or a display formatted image in response to the input. The learned values and network architecture, with any algorithms (e.g., extrapolation and gradient update) determine the output from the input.

The output of the machine-learned network is a two-dimensional distribution of pixels representing an area of the patient and/or a three-dimensional distribution of voxels representing a volume of the patient. The output from the last iteration may be used as the output representation of the patient.

In one embodiment, the machine-learned network of the machine-learned model implements a regularizer. The reconstruction is performed iteratively with gradients, a Fourier transform, and the regularizer. The regularizer receives image space information from the Fourier transform or after the gradient operation and outputs denoised image space information. The machine-learned network may be an image-to-image network with DenseNet blocks or have another architecture, such as a CNN.

In another embodiment, the machine-learned model includes an extrapolation function or algorithm with a machine-learned parameter. For example, the value for the weight applied in a Nesterov or Polyak heavy ball extrapolation was machine learned. The extrapolation operates on an input image data and outputs to the gradient update. The learned value of the parameter is used in the extrapolation. For example, the machine-learned parameter is a weight for a difference between current and previous image values. The extrapolation provides momentum to the gradient descent.

The reconstruction may be iterative. Each iteration determines an updated image object from an input image object, with the gradient operation comparing fit with the measurements. For example, an unrolled iterative reconstruction is performed. Different machine-learned networks and/or extrapolation weights are used for the different iterations. Some iterations may not include regularization. For example, an initial sequence of iterations includes extrapolation with learned weights and does not include regularization, and a subsequent sequence of iterations includes regularization with or without extrapolation with learned weights. After the last iteration, the output representation by the regularizer or gradient update is provided for imaging or the medical record of the patient.

Other processing may be performed on the input k-space measurements before input. Other processing may be performed on the output representation or reconstruction, such as spatial filtering, color mapping, and/or display formatting. In one embodiment, the machine-learned network outputs voxels or scalar values for a volume spatial distribution as the medical image. Volume rendering is performed to generate a display image as a further display image. In alternative embodiments, the machine-learned network outputs the display image directly in response to the input In act 540, a display (e.g., display screen) displays the medical image, such as the MR image. The medical image is formatted for display on the display. The display presents the image for viewing by the user, radiologist, physician, clinician, and/or patient. The image assists in diagnosis.

The displayed image may represent a planar region or area in the patient. Alternatively or additionally, the displayed image is a volume or surface rendering from voxels (three-dimensional distribution) to the two-dimensional display.

The same deep machine-learned model may be used for different patients. The same or different copies of the same machine-learned model are applied for different patients, resulting in reconstruction of patient-specific representations or reconstructions using the same values or weights of the learned parameters of the model. Different patients and/or the same patient at a different time may be scanned while the same or fixed trained model is used in reconstruction the image. Other copies of the same deep machine-learned model may be used for other patients with the same or different scan settings and corresponding sampling or under sampling in k-space.

FIG. 8 shows an example of the effects of the gradient steps and momentum with respect to the number of iterations. The peak signal-to-noise ratio (PSNR) is used as a measurement of quality in the reconstruction. The reconstruction is performed without machine learning using a gradient step of 1. Extrapolation is not included. This process requires the greatest number of iterations and still does not reach a same quality level as the other processes. The gradient step, $\alpha_k$, may be learned instead. Extrapolation is not included. Where $\alpha_k$ is learned, a fewer number of iterations are needed, and a better quality is reached as compared to non-learned. Where heavy ball and/or Nesterov extrapolation is included in the gradient step learned process, the fewest numbers of iterations and the greatest quality result, with Nesterov showing better performance than heavy ball extrapolation. Where the gradient step is 1 (no learning) and FISTA extrapolation where the weight is not learned are provided, intermediate results with lesser quality and more iterations than Nesterov with learned gradients is provided.

Although the subject matter has been described in terms of exemplary embodiments, it is not limited thereto. Rather, the appended claims should be construed broadly, to include other variants and embodiments, which can be made by those skilled in the art.

What is claimed is:

1. A method for reconstruction of a medical image in a medical imaging system, the method comprising:
scanning, by the medical imaging system, a patient, the scanning resulting in measurements;
reconstructing, by an image processor, the medical image from the measurements, wherein the reconstructing comprises an unrolled iterative reconstruction including regularization implemented with a machine-learned network and the reconstructing includes an extrapolation step with a machine-learned parameter having different values for different iterations; and
displaying the medical image.

2. The method of claim 1 wherein scanning comprises scanning with the medical imaging system being a magnetic resonance (MR) scanner and the measurements being k-space measurements.

3. The method of claim 1 wherein reconstructing comprises reconstructing a three-dimensional distribution of voxels representing a volume of the patient, and wherein displaying comprises volume or surface rendering from the voxels to a two-dimensional display.

4. The method of claim 1 wherein reconstructing comprises reconstructing with different machine-learned networks and different machine-learned parameters for extrapolation for different iterations, the machine-learned network being one of the different machine-learned networks for one of the iterations and the machine-learned parameter for the extrapolation step being one of the different machine-learned parameters for the one iteration.

5. The method of claim 1 wherein a first sequence of iterations of the unrolled iterative reconstruction does not include regularization and a second sequence after the first sequence includes regularization, one of the iterations of the second sequence using the regularization and the extrapolation step.

6. The method of claim 1 wherein reconstructing comprises reconstructing with the extrapolation step comprising a Nesterov extrapolation wherein the machine-learned parameter comprises a weight for a difference between current and previous image values.

7. The method of claim 1 wherein reconstructing comprises reconstructing with the extrapolation step comprising a Polyak heavy ball extrapolation wherein the machine-learned parameter comprises a weight for a difference between current and previous image values.

8. The method of claim 1 wherein reconstructing comprises reconstructing with the extrapolation step providing momentum to a gradient descent and the regularization operating on an output of the gradient descent.

9. The method of claim 1 wherein reconstructing comprises reconstructing with the machine-learned network comprises a convolutional neural network.

10. The method of claim 1 wherein reconstructing comprises determining an updated image object from an input image object.

11. A method of machine training for reconstruction in medical imaging, the method comprising:
machine training a first sequence of neural networks and weights of an extrapolation for the reconstruction in the medical imaging, the first sequence comprising an unrolled reconstruction where different iterations of the unrolled reconstruction include different ones of the neural networks and the extrapolation with different ones of the weights; and
storing the neural networks and the weights.

12. The method of claim 11 wherein machine training comprises machine training of the neural networks as convolutional neural networks performing regularization in the reconstruction.

13. The method of claim 11 wherein machine training comprises machine training the weights as weights of a Nesterov extrapolation.

14. The method of claim 11 wherein machine training comprises machine training the weights as weights of a heavy ball extrapolation.

15. The method of claim 11 wherein machine training comprises machine training a second sequence with additional weights for extrapolation and without the neural networks, the second sequence comprising additional iterations of the reconstruction occurring prior to the first sequence.

16. A system for reconstruction in medical imaging, the system comprising:
 a medical scanner configured to scan a region of a patient, the scan providing scan data;
 an image processor configured to reconstruct a representation of the region from the scan data, the image processor configured to reconstruct by application of an extrapolation step with a machine-learned weight and application of a gradient update operating on an output of the extrapolation step, wherein the reconstruction comprises an unrolled iterative reconstruction with the machine-learned weight having different values for the extrapolation step for different iterations of the unrolled iterative reconstruction; and
 a display configured to display an image of the region from the reconstructed representation.

17. The system of claim 16 wherein the image processor is configured to reconstruct by application of a machine-learned model as a regularization operating on an output of the gradient update.

18. The system of claim 16 wherein the extrapolation step comprises a Nesterov extrapolation.

\* \* \* \* \*